(12) United States Patent
Rosario

(10) Patent No.: US 11,484,082 B2
(45) Date of Patent: Nov. 1, 2022

(54) GLASSES/CAP SYSTEM

(71) Applicant: Israel Rosario, Davie, FL (US)

(72) Inventor: Israel Rosario, Davie, FL (US)

( * ) Notice: Subject to any disclaimer, the term of this patent is extended or adjusted under 35 U.S.C. 154(b) by 0 days.

(21) Appl. No.: 17/472,598

(22) Filed: Sep. 11, 2021

(65) Prior Publication Data

US 2022/0031002 A1  Feb. 3, 2022

Related U.S. Application Data

(63) Continuation-in-part of application No. 17/156,531, filed on Jan. 23, 2021, now Pat. No. 11,147,331.

(60) Provisional application No. 62/978,891, filed on Feb. 20, 2020.

(51) Int. Cl.
```
A42B 1/247    (2021.01)
A42B 1/22     (2006.01)
G02C 3/02     (2006.01)
G02C 3/00     (2006.01)
```

(52) U.S. Cl.
CPC .............. *A42B 1/247* (2013.01); *A42B 1/22* (2013.01); *G02C 3/02* (2013.01); *G02C 3/006* (2013.01); *G02C 2200/02* (2013.01)

(58) Field of Classification Search
CPC .......... A42B 1/247; A42B 1/22; A42B 1/225; A42B 3/185; G02C 3/02; G02C 3/006; G02C 2200/02
See application file for complete search history.

(56) References Cited

U.S. PATENT DOCUMENTS

| | | | | |
|---|---|---|---|---|
| 4,179,753 A * | 12/1979 | Aronberg | ............... | A42B 1/247 2/195.3 |
| 4,640,287 A * | 2/1987 | Anderson | ............... | A44B 18/00 450/36 |
| 5,737,054 A * | 4/1998 | Chao | ................... | G02C 9/00 351/57 |
| 6,174,058 B1 * | 1/2001 | Hsiao | .................. | A42B 1/0182 2/10 |
| 6,279,167 B1 * | 8/2001 | Johnson | ................ | A42B 1/004 446/72 |
| 6,283,594 B1 * | 9/2001 | Hamano | ................. | G02C 3/00 351/158 |
| 6,764,175 B1 * | 7/2004 | Chen | ................... | G02C 9/00 351/57 |
| 6,966,851 B1 * | 11/2005 | England | ................ | A63B 57/353 2/209.13 |
| 7,496,991 B2 * | 3/2009 | Avery | ................. | G02C 3/04 351/158 |
| 8,696,112 B1 * | 4/2014 | Vaught | ................. | G02C 3/02 351/158 |
| 10,470,531 B1 * | 11/2019 | Yanes | .................. | A44C 1/00 |
| 11,147,331 B1 * | 10/2021 | Rosario | ................ | A42B 1/247 |
| 2005/0039308 A1 * | 2/2005 | Rogers | ................. | A44B 1/04 24/113 R |
| 2006/0050224 A1 * | 3/2006 | Smith | ................... | G02C 9/00 351/47 |

(Continued)

*Primary Examiner* — Heather Mangine
(74) *Attorney, Agent, or Firm* — Sandra L. Layer

(57) ABSTRACT

A glasses/cap system for separably coupling glasses to a cap and for securing the glasses to the hat in either a usage orientation or a storage orientation. The coupling components mainly consisting of complementary magnets and ferromagnetic materials located in reciprocal parts of the glasses and cap alone or in combination with push type or bungee type connectors.

8 Claims, 5 Drawing Sheets

(56) References Cited

U.S. PATENT DOCUMENTS

| | | | |
|---|---|---|---|
| 2006/0152671 A1* | 7/2006 | Risso | G02C 3/02 351/155 |
| 2006/0203188 A1* | 9/2006 | Zelman | G02C 9/00 351/141 |
| 2008/0060110 A1* | 3/2008 | Schmelzer | A44B 1/32 2/69 |
| 2008/0282517 A1* | 11/2008 | Claro | A45C 13/1069 24/303 |
| 2009/0103043 A1* | 4/2009 | Ramsey | A42B 1/247 351/155 |
| 2009/0284712 A1* | 11/2009 | Brooks | A42B 1/247 351/155 |
| 2010/0212066 A1* | 8/2010 | Gilman | A42B 1/247 2/209.13 |
| 2012/0216374 A1* | 8/2012 | Manuello | A41F 1/002 24/303 |
| 2013/0278883 A1* | 10/2013 | Lenz | A61F 9/027 351/123 |
| 2014/0013480 A1* | 1/2014 | Treger | A42B 1/247 2/10 |
| 2014/0063443 A1* | 3/2014 | Berger | G02C 3/02 351/155 |
| 2014/0101820 A1* | 4/2014 | Cho | A42B 1/22 2/171 |
| 2015/0013114 A1* | 1/2015 | Grame | A45F 5/02 24/3.8 |
| 2015/0098055 A1* | 4/2015 | Tahsler | G02C 3/04 351/155 |
| 2015/0131049 A1* | 5/2015 | Lando | G02C 3/003 351/123 |
| 2015/0181971 A1* | 7/2015 | York | A42B 1/22 2/209.3 |
| 2015/0346509 A1* | 12/2015 | Walker | G02C 3/02 351/178 |
| 2017/0127813 A1* | 5/2017 | Calman | A45F 5/021 |
| 2018/0055128 A1* | 3/2018 | Hall, Sr. | A42B 1/247 |
| 2018/0092427 A1* | 4/2018 | Jacobsen | A42B 3/221 |
| 2018/0129067 A1* | 5/2018 | Boedecker | G02C 5/20 |
| 2018/0177257 A1* | 6/2018 | Sears | A42B 1/248 |
| 2018/0335640 A1* | 11/2018 | Fulks | G02C 3/006 |
| 2019/0101772 A1* | 4/2019 | Lowe | G02C 3/02 |
| 2019/0116904 A1* | 4/2019 | Popoca Perez | A41F 9/002 |
| 2019/0183201 A1* | 6/2019 | Defino | A42B 1/248 |
| 2019/0246731 A1* | 8/2019 | Luo | G02C 3/02 |
| 2019/0328069 A1* | 10/2019 | Svendsen | A42B 1/24 |
| 2019/0376646 A1* | 12/2019 | Pombo | F16M 13/04 |
| 2020/0159039 A1* | 5/2020 | Masters | A42B 1/247 |
| 2020/0205499 A1* | 7/2020 | Draper | G02C 3/02 |
| 2020/0253296 A1* | 8/2020 | Washio | A42B 1/048 |
| 2021/0000208 A1* | 1/2021 | Whedbee, II | A42B 1/247 |
| 2021/0386152 A1* | 12/2021 | Jackson | A42B 1/24 |
| 2022/0031002 A1* | 2/2022 | Rosario | G02C 3/02 |

\* cited by examiner

GLASSES/CAP SYSTEM

RELATED APPLICATION

The present patent application is a continuation-in-part of U.S. patent application Ser. No. 17/156,531 entitled "GLASSES/CAP SYSTEM" filed on Jan. 23, 2021 which claims priority to the corresponding provisional patent application Ser. No. 62/978,891, entitled "GLASSES/CAP SYSTEM" filed on Feb. 20, 2020, the subject matter of which applications are incorporated in entirety herein by reference.

BACKGROUND OF THE INVENTION

Field of the Invention

The present invention relates to a glasses/cap system and more particularly pertains to separably coupling glasses to a cap and for securing the glasses in either a usage orientation or a storage orientation. The coupling and the securing being done in a safe, convenient, and economical manner.

Description of the Prior Art

The use of glasses and caps of known design and configurations is known in the prior art. More specifically, glasses and caps of known designs and configurations previously devised and utilized for the purpose of securing glasses and caps are known to consist basically of familiar, expected, and obvious structural configurations, notwithstanding the myriad of designs encompassed by the crowded prior art which has been developed for the fulfillment of countless objectives and requirements.

While these known devices fulfill their respective, particular objectives and requirements, they do not describe a glasses/cap system that allows for separably coupling glasses to a cap and for securing the glasses in either a usage orientation or a storage orientation. The coupling and the securing being done in a safe, convenient, and economical manner.

In this respect, the glasses/cap system according to the present invention substantially departs from the conventional concepts and designs of the prior art, and in doing so provides an apparatus primarily developed for the purpose of separably coupling glasses to a cap and for securing the glasses in either a usage orientation or a storage orientation. The coupling and the securing being done in a safe, convenient, and economical manner.

Therefore, it can be appreciated that there exists a continuing need for a new and improved glasses/cap system which can be used for separably coupling glasses to a cap and for securing the glasses in either a usage orientation or a storage orientation. In this regard, the present invention substantially fulfills these needs.

SUMMARY OF THE INVENTION

In view of the foregoing disadvantages inherent in the known types of glasses and caps of known designs and configurations now present in the prior art, the present invention provides an improved glasses/cap system. As such, the general purpose of the present invention, which will be described subsequently in greater detail, is to provide a new and improved glasses/cap system and method which has all the advantages of the prior art and none of the disadvantages.

To attain this, for a broad perspective, the present invention essentially comprises a cap with a closed top, an open bottom and a forwardly extending brim, glasses having a forwardly facing bridge and rearwardly projecting temples and coupling components to separably couple and uncouple the glasses to the cap.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved glasses/cap system which has all of the advantages of the prior art glasses and caps of known designs and configurations and none of the disadvantages.

It is another object of the present invention to provide a new and improved glasses/cap system which may be easily and efficiently manufactured and marketed.

It is a further object of the present invention to provide a new and improved glasses/cap system which is of durable and reliable constructions.

An even further object of the present invention is to provide a new and improved glasses/cap system which is susceptible of a low cost of manufacture with regard to both materials and labor, and which accordingly is then susceptible of low prices of sale to the consuming public, thereby making such glasses/cap system economically available to the buying public.

Lastly, it is an object of the present invention to provide a glasses/cap system for separably coupling glasses to a cap and for securing the glasses in either a usage orientation or a storage orientation.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3a shows a plurality of magnets. FIG. 3b shows an elongated magnetic strip. FIG. 3c shows a slidable magnet. FIG. 3d shows a ferrous metal section with a plurality of embedded magnets.

The same reference numerals refer to the same parts throughout the various Figures.

DESCRIPTION OF THE PREFERRED EMBODIMENT

Figure 1:
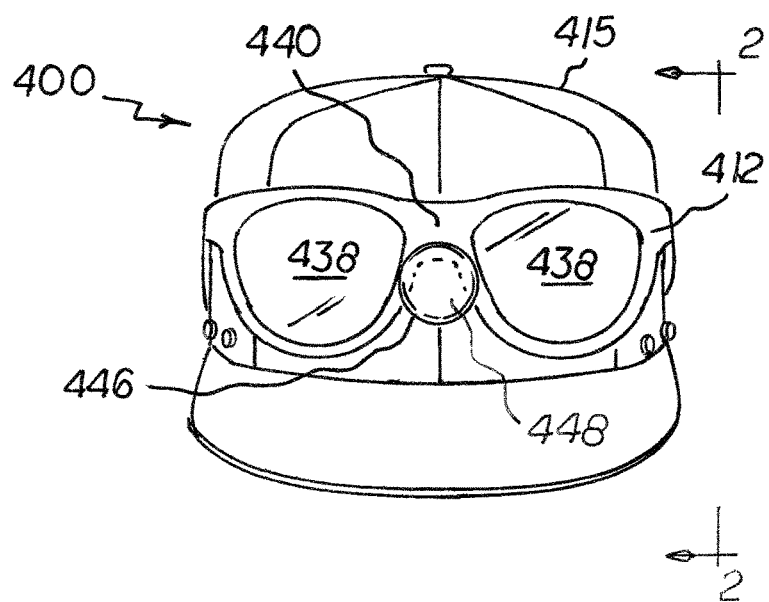
FIG. 1 is a front elevational view of a glasses/cap system constructed in accordance with the principles of the present invention.
Figure 2:
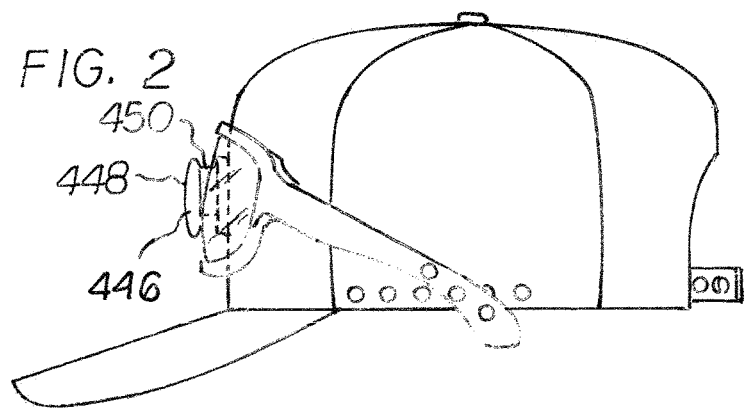
FIG. 2 is a side elevational view taken at line 2-2 of FIG. 1 showing the glasses secured to the hat in the inoperable position.

With reference now to the drawings, and in particular to FIG. 1 thereof, the preferred embodiment of the new and improved glasses/cap system embodying the principles and concepts of the present invention and generally designated by the reference numeral 400 will be described.

The present invention, the glasses/cap system 400 is comprised of a plurality of components. Such components are individually configured and correlated with respect to each other so as to attain the desired objective. Such components in their broadest context include a cap, glasses and a support system. The cap 14 has an upper section with a closed top and an open bottom. The open bottom has a brim extending forwardly. The open bottom has an opening located rearwardly. The cap has side sections between the brim and the opening. Next provided is glasses. The glasses include two laterally spaced lenses forwardly and a bridge between the lenses coupling together the lenses interiorly. The glasses include two temples with lengths extending rearwardly from the lenses exteriorly. A support assembly separately couples the glasses with respect to the cap in an operative orientation with the lenses below the brim. The support assembly selectively secures the glasses to the cap in an inoperative orientation with the lenses above the brim.

From a specific perspective, in reference to FIGS. 1 through 5 the preferred embodiment of the invention of the present application is a glasses/cap system 400 for separably coupling glasses 412 to a cap 14 and for securing the glasses in either a usage orientation or a storage orientation. The coupling and the securing being done in a safe, convenient, and economical manner. In the preferred embodiment first provided is a cap 14. The cap has an upper section 415 with a closed top 20 and an open bottom 22. The open bottom has an opening 24 located rearwardly. The opening has size adjustment capabilities through a first strap 26 with rear magnets 28 and a second strap 30 with rear ferromagnetic components 32. The cap has side sections 34 between the brim and the opening.

Next provided in the preferred embodiment are glasses 412. The glasses include two laterally spaced lenses 438 forwardly. The glasses include a bridge 440 between the lenses and coupling together the lenses interiorly. The glasses include two temples 42 extending rearwardly from the lenses exteriorly.

Figure 3:
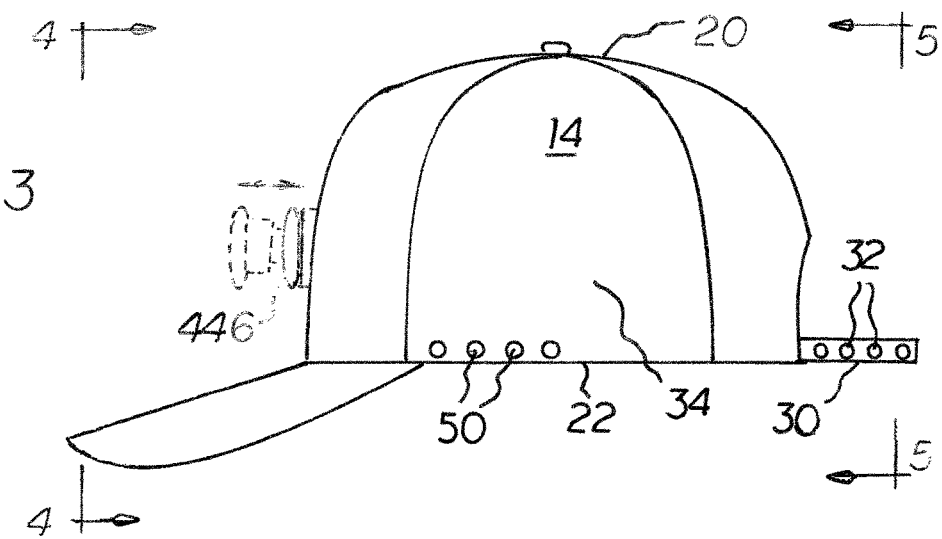
FIG. 3 is a side elevational view of a glasses/cap system constructed in accordance with the principles of the present invention showing the operation of the extendable socket for storage and for receiving the glasses.
Figure 3A:
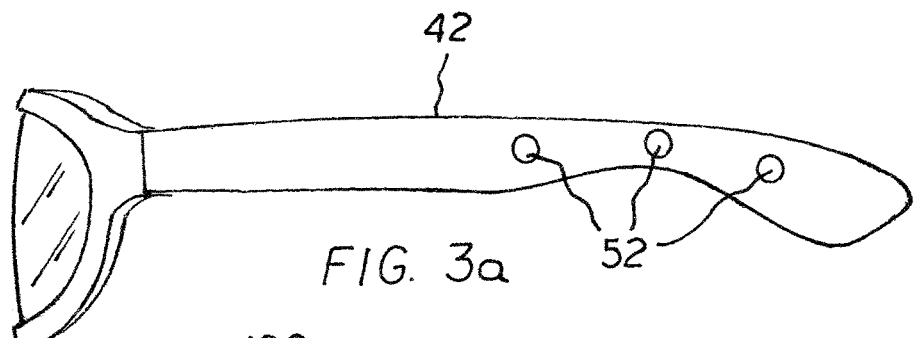
FIGS. 3a-3d are enlarged showings of various magnets secured to the temples of glasses adapted to be removeably coupled to sides of a cap.

A support assembly shown in FIG. 3a is provided. The support assembly separably couples the glasses with respect to the cap. The support assembly selectively secures the glasses to the cap in an operative orientation with the lenses below the brim. The support assembly secures the glasses to the cap in an inoperative orientation with the lenses above the brim. The support assembly includes a plurality of side magnets 52 laterally spaced along the temples 42 and a plurality of laterally spaced side ferromagnetic components 50 laterally spaced in the lower portion of the side sections 34 along the open bottom.

In the preferred embodiment the support assembly includes a bridge receiving component 446 above the brim. The bridge receiving component 446 includes a mushroom shaped extendable socket adapted to be retracted when the lenses are in the operative orientation with the lenses in use below the brim and to be extended for receiving and supporting the bridge when the lenses are in an inoperative orientation for storage above the brim. The mushroom shaped element is an extendable socket with a forward section 448, a central section 450 adapted to compress and extend, and a base attached to the forward facing section of the hat above the brim. When the central section is compressed, the forward section may be locked to the base into a closed position. When the central section of the mushroom shaped element is extended in the open position, the central section is capable of receiving the bridge of the glasses, the bridge resting on the central section when the glasses are in the inoperative orientation for storage.

The support assembly separably couples the glasses with respect to the cap. The support assembly selectively secures the glasses to the cap in an operative orientation with the lenses below the brim. The support assembly selectively secures the glasses to the cap in an inoperative orientation with the lenses above the brim.

Figure 3B:
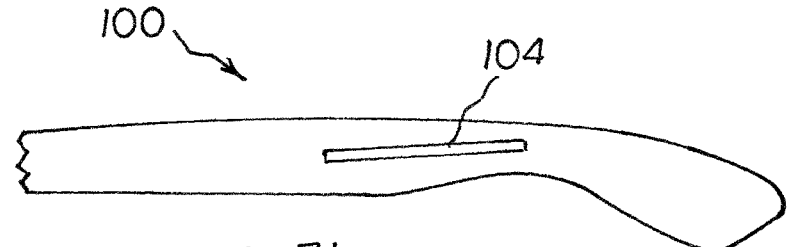

In an alternate embodiment of the glasses/cap system 100, shown in FIG. 3b, the support assembly includes two elongated magnets 104, one of the elongated magnets in each temple. Also included are a plurality of laterally spaced side ferromagnetic components 50 laterally spaced in the lower portion of the side sections 34 along the open bottom.

Figure 3C:
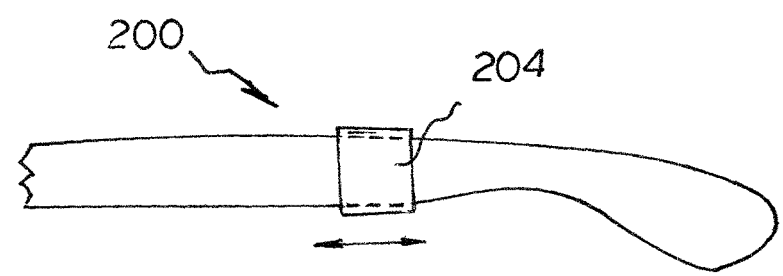

In another alternate embodiment of the glasses/cap system 200, shown in FIG. 3c, the support assembly includes two slidable magnets 204, one of the slidable magnets in each temple. In the embodiment, the support assembly also includes a plurality of side ferromagnetic components 50 laterally spaced in the lower portion of the side sections 34 along the open bottom.

Figure 3D:
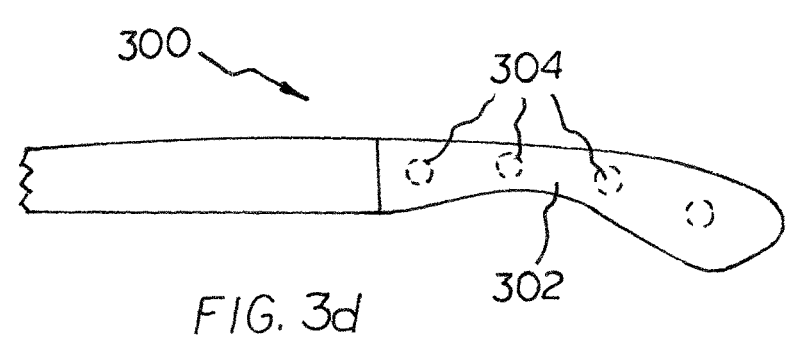
Figure 4:
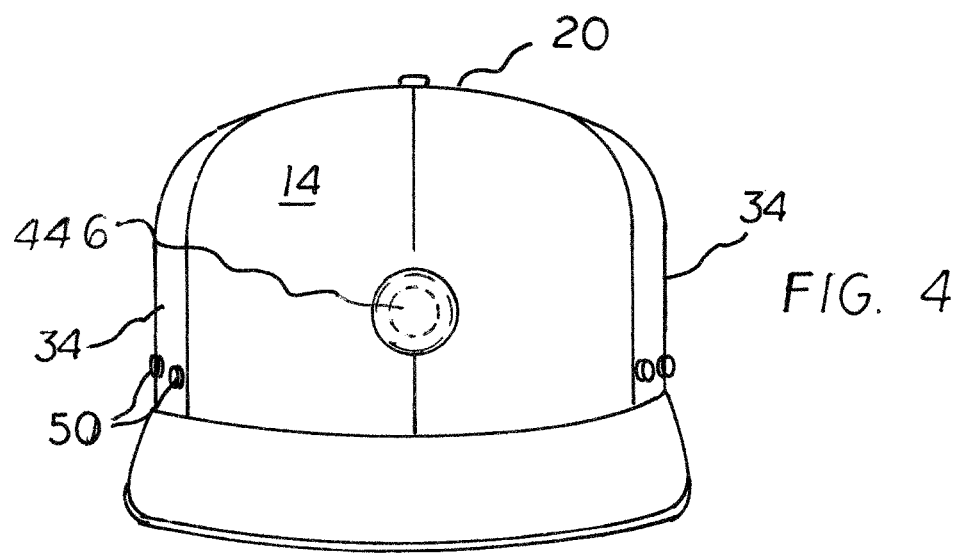
FIG. 4 is a front elevational view of a cap/glasses system taken along lines 4-4 of FIG. 3.
Figure 5:
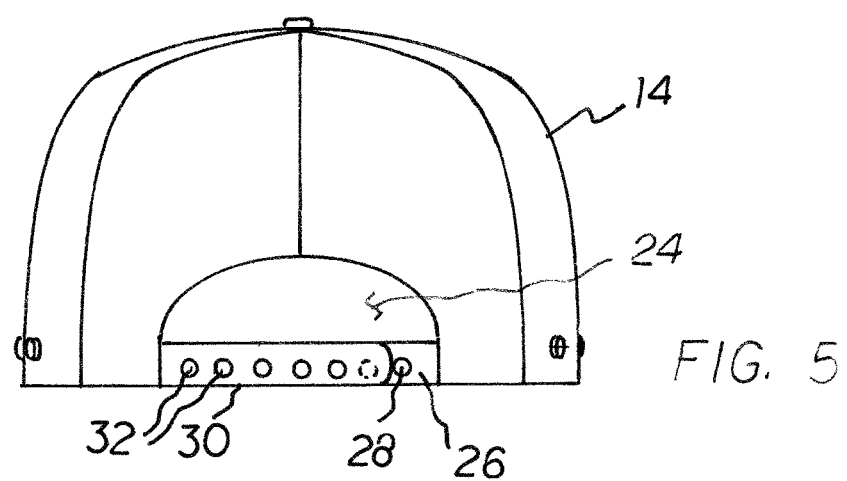
FIG. 5 is a rear elevational view taken along lines 5-5 of FIG. 3.
Figure 6:
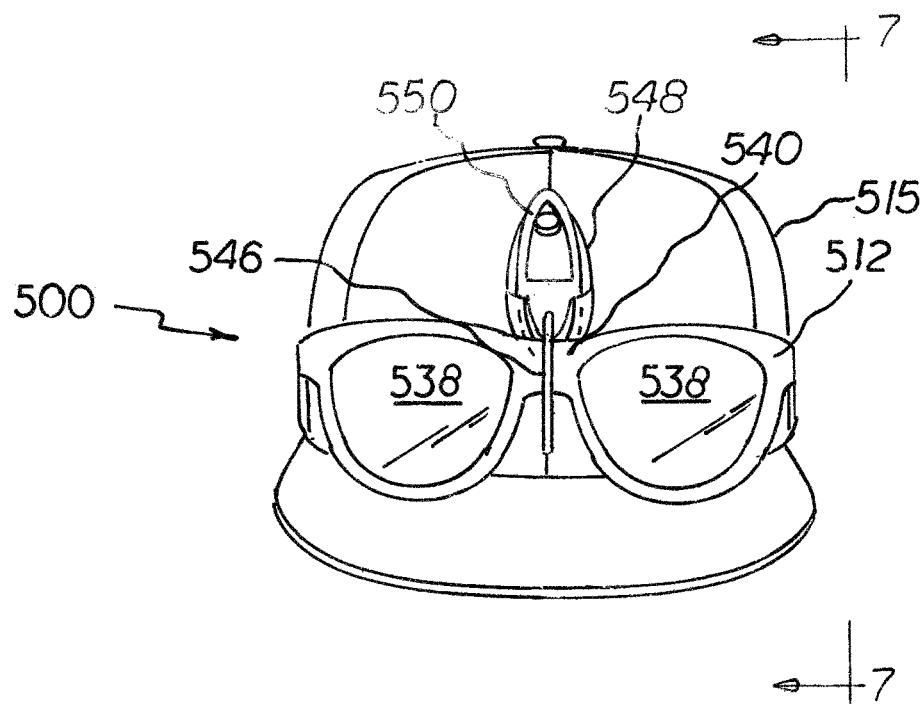
FIG. 6 is a front elevational view of a glasses/cap system constructed in accordance with an alternate embodiment of the invention.
Figure 7:
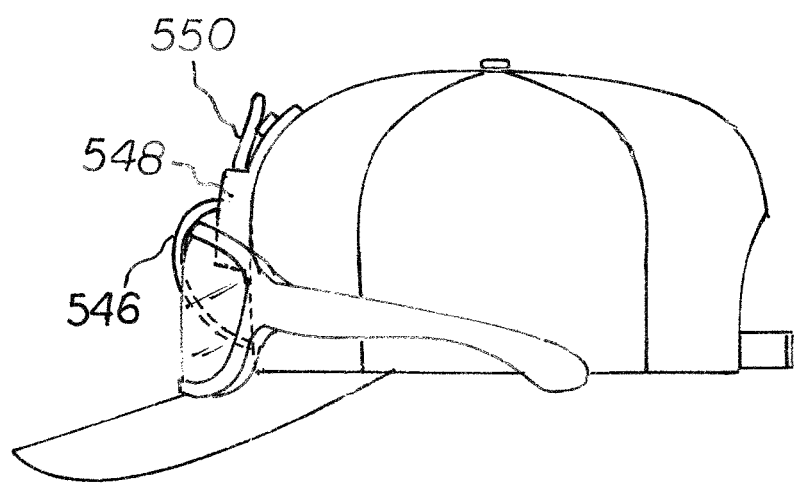
FIG. 7 is a side elevational view taken along line 7-7 of FIG. 6.
Figure 8:
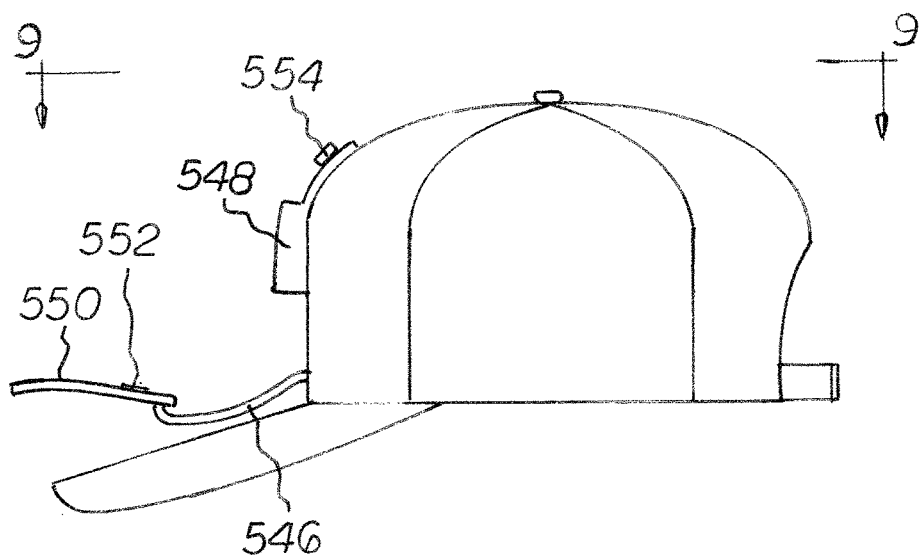
FIG. 8 is a side elevational view of a glasses/cap system constructed in accordance with an alternate embodiment with the connector end of the bungee uncoupled from the upper retaining closure.
Figure 9:
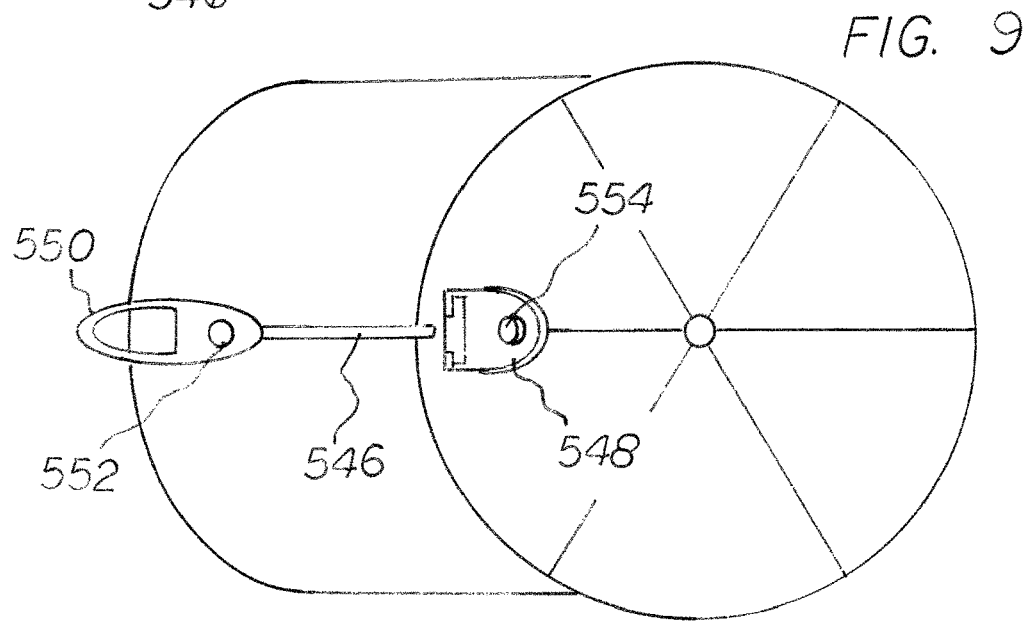
FIG. 9 is a top view taken along line 9-9 of FIG. 8.
Figures 10, 11:
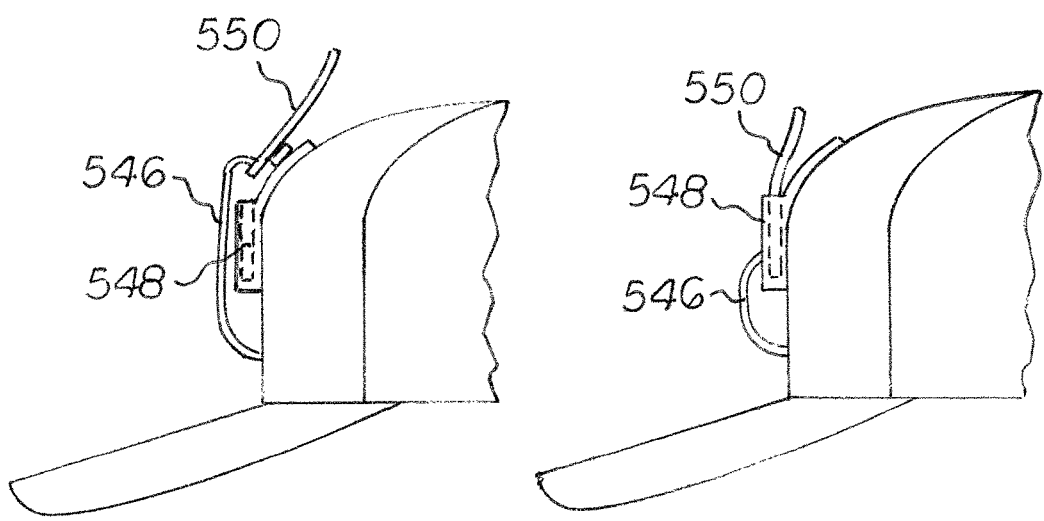
FIG. 10 is a side view showing the connector end of the bungee aligned with the upper retaining closure.
FIG. 11 is a side view showing the connector end of the bungee coupled to the upper retaining closure.

In still another alternate embodiment of the glasses/cap system 300, shown in FIG. 3d, the support assembly includes two ferrous metal sections 302 in the temples with pluralities of imbedded magnets, one plurality of imbedded magnets 304 in each ferrous section. This embodiment includes a plurality of laterally spaced side ferromagnetic components 50 laterally spaced in the lower portion of the side sections 34 along the open bottom.

In a final embodiment of the glasses/cap system 500 shown in FIGS. 6 through 11, the bridge receiving component includes a bungee cord type fastener having an elastic cord 546 with an upper retaining closure 548, the elastic cord having a first end and a second end. The first end attached to the forward facing section of the hat above the brim and the second end removably couple able to the upper retaining closure. The second end forming a connecting end 550 and adapted to be uncoupled from the upper retaining closure 548 when moving the lenses from the operative orientation with the lenses in use below the brim and to be coupled to the upper retaining closure for retaining the bridge when the lenses are in the inoperative orientation above the brim for storage. The connecting end formed with a ferromagnetic component 552. The upper retaining closure formed with a magnet 554. The magnet 554 positioned on the upper retaining closure 548 and aligned to attract the ferromagnetic component and guide the connecting end of the elastic cord when coupling to the upper retaining closure.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A glasses/cap system for separably coupling glasses to a cap in a safe, convenient and economical manner, the system comprising, in combination:
   the cap with a closed top and an open bottom, the open bottom having a lower edge, a forward facing section, two side sections and a rearward facing section, a forwardly extending brim extending from the lower edge of the open bottom within the forward facing section;
   the glasses comprising a forwardly facing bridge and rearwardly projecting temples; and
   coupling components to separably couple and uncouple the glasses to the cap, the coupling components including a bridge receiving component attached to forward facing section of the cap above the forwardly extending brim for receiving the forwardly facing bridge of the glasses, the bridge receiving component consisting of an extendable socket having forward section, a central section and a base, the central section adapted to compress and extend, the base attached to the forward facing section of the hat above the forwardly extending brim, the forward section rotatable lockable to the base when the central section is compressed, the central section capable of receiving the forwardly facing bridge of the glasses when extended and attached to the cap above the forwardly extending brim for receiving the forwardly facing bridge of the glasses.

2. The system as set forth in claim 1 wherein the coupling components include magnets on the rearwardly projecting temples of the glasses and ferromagnetic components laterally spaced in the two side sections adjacent to and above the lower edge along the open bottom of the cap.

3. The system set forth in claim 1 further including an opening in the rearward facing section of the cap, a first strip and a second strip, the first strip extending laterally from a first side of the opening, and the second strip extending laterally from a second side of the opening, the first strip comprising laterally spaced magnets and the second strip comprising ferromagnetic components, the first strip and the second strip overlapping at various distances aligning the magnets and ferromagnetic components to accommodate various head sizes.

4. A glasses/cap system for separably coupling glasses to a cap in a safe, convenient and economical manner, the system comprising, in combination:
   the cap with a closed top and an open bottom, the open bottom having a lower edge, a forward facing section, two side sections and a rearward facing section, a forwardly extending brim extending from the lower edge of the open bottom within the forward facing section;
   the glasses comprising a forwardly facing bridge and rearwardly projecting temples;
   coupling components to separably couple and uncouple the glasses to the cap, the coupling components comprised of magnets on the rearwardly projecting temples of the glasses and ferromagnetic components laterally spaced in the two side sections adjacent to and above the lower edge along the open bottom of the cap;
   a bridge retaining component, the bridge retaining component attached to the forward facing section above the forwardly extending brim of the cap, the bridge retaining component comprising an extendable socket, the extendable socket having a forward section, a central section and a base, the central section adapted to compress and extend, the base attached to the forward facing section of the hat above the forwardly extending brim, the forward section rotatable lockable to the base when the central section is compressed, the central section capable of receiving the forwardly facing bridge of the glasses when extended; and
   an opening in the rearward facing section of the cap, a first strips and a second strip, the first strip extending laterally from a first side of the opening, and the second strip extending laterally from a second side of the opening, the first strip comprising laterally spaced magnets and the second strip comprising ferromagnetic components, the first strip and the second strip overlapping at various distances aligning the magnets and ferromagnetic components to accommodate various head sizes.

5. The system set forth in claim 4 wherein the magnets on the rearwardly projecting temples of the glasses comprise a plurality of laterally spaced magnets on the rearwardly projecting temples of the glasses.

6. The system set forth in claim 4 wherein the magnets on the rearwardly projecting temples of the glasses comprise an elongated rectangular magnet in each of the rearwardly projecting temples of the glasses.

7. The system set forth in claim 4 wherein the magnets on the rearwardly projecting temples of the glasses comprise a slidable magnet coupled to each of the rearwardly projecting temples of the glasses.

8. The system set forth in claim 4 wherein the magnets on the rearwardly projecting temples of the glasses comprise two ferrous metal sections with pluralities of imbedded magnets in the rearwardly projecting temples of the glasses.

* * * * *